(12) United States Patent
Gentile et al.

(10) Patent No.: US 9,721,223 B2
(45) Date of Patent: Aug. 1, 2017

(54) METHOD AND SYSTEM FOR RETRIEVING INFORMATION USING SERIALIZED SCANNABLE CODES

(75) Inventors: Carl Gentile, Dallas, TX (US); Gareth Raab, Coppell, TX (US); Kyle Thomas, Dallas, TX (US); Brian Barker, Dallas, TX (US)

(73) Assignee: Atrium Windows and Doors, Inc., Dallas, TX (US)

( * ) Notice: Subject to any disclaimer, the term of this patent is extended or adjusted under 35 U.S.C. 154(b) by 0 days.

(21) Appl. No.: 13/470,718

(22) Filed: May 14, 2012

(65) Prior Publication Data
US 2013/0299569 A1 Nov. 14, 2013

(51) Int. Cl.
*G06K 7/00* (2006.01)
*G06Q 10/08* (2012.01)

(52) U.S. Cl.
CPC ......... *G06Q 10/08* (2013.01); *G06Q 10/0833* (2013.01)

(58) Field of Classification Search
USPC ................................................ 235/375, 385
See application file for complete search history.

(56) References Cited

U.S. PATENT DOCUMENTS

| | | | |
|---|---|---|---|
| 5,591,956 A | 1/1997 | Longacre, Jr. et al. | |
| 6,550,685 B1* | 4/2003 | Kindberg | 235/494 |
| 7,606,533 B2 | 10/2009 | Perttila et al. | |
| 7,637,430 B2 | 12/2009 | Hawley et al. | |
| 7,654,454 B2 | 2/2010 | Silverbrook et al. | |
| 8,096,466 B2 | 1/2012 | Silverbrook et al. | |
| 2001/0049734 A1* | 12/2001 | Suwabe et al. | 709/225 |
| 2004/0195321 A1* | 10/2004 | Silverbrook et al. | 235/385 |
| 2007/0136202 A1* | 6/2007 | Noma et al. | 705/51 |
| 2010/0097220 A1* | 4/2010 | Cheng | F03D 17/00 340/572.1 |
| 2011/0248826 A1 | 10/2011 | Criel et al. | |
| 2011/0276570 A1 | 11/2011 | Larsson et al. | |
| 2012/0153015 A1* | 6/2012 | Gomez et al. | 235/375 |
| 2012/0181330 A1* | 7/2012 | Kim | G06Q 30/02 235/375 |
| 2013/0069794 A1* | 3/2013 | Terwilliger | G06Q 10/08 340/815.45 |

OTHER PUBLICATIONS

US 7,988,052, 08/2011, Ehrhart et al. (withdrawn)

* cited by examiner

*Primary Examiner* — Matthew Mikels
(74) *Attorney, Agent, or Firm* — Duncan Galloway Egan; Greenwald, PLLC; Kevin T. Duncan

(57) ABSTRACT

A system associates different data types with a specific product using a unique identification tag that can be used in a product identification process. The system associates a unique identifier with a unique record related to an individual product, generates a unique identifier associated with an individual product, attaches a machine readable unique identification tag to the individual product, the unique identification tag being associated with the unique identifier and containing information associated with the individual product, associates the unique identifier with a unique record, stores the association and the unique record, receives a signal comprising the unique identifier and having been generated remotely by a device reading the unique identification tag, and generates, responsive to the signal, a user interface.

20 Claims, 11 Drawing Sheets

Service Request Completed

Your service request has been created and submitted.

Your service request number is: 2022

A service technician will contact you within 24 hours.

METHOD AND SYSTEM FOR RETRIEVING INFORMATION USING SERIALIZED SCANNABLE CODES

FIELD OF THE INVENTION

This invention generally relates to scan-able unique identification tags containing a unique identifier associated with individual products, e.g. windows, appliances and other products, to allow for easy retrieval of information specific to an individual product and to follow-up operations, such as in-home product registration, service response and ordering replacement parts. More specifically, this invention relates to unique product identification tags comprising at least a unique product identifier that, when scanned, directs the scanner to a web based application which displays information and a set of functions based on both context information including the constituent performing the scan and an individual product's unique identifier.

BACKGROUND OF THE INVENTION

Businesses face many challenges in efficiently tracking information specific to individual products they manufacture. They face additional challenges in making this information available to their consumers, employees and contractors, and in linking individualized product information to the purchaser of the product, especially post-purchase. In today's world of highly customizable and configurable products, it is especially important to understand the options and features of a product that requires follow-up operations. Current methods do not provide a way for manufacturers, retailers, and consumers to effectively monitor, update, and utilize information pertaining to an individual product post-purchase. This creates problems in linking data such as warranty information, product specifications, installation instructions, service information, and consumer information to an individual product and facilitate post-purchase operations, e.g., service, and tracking and processing useful data about product usage and performance.

QR Codes have been used in the past to track things such as vehicle parts during a manufacturing process or provide consumers with generic marketing information about a particular company, product line, or product model. QR Codes have a storage capacity of around 3,000 characters. The design of a QR Code allows for fast decoding which can be done by a number of devices including QR Code readers and other devices adapted to execute QR Code reading applications, e.g., cell phones, tablet computers, and other hand-held computers. A QR Code can be used to store a URL ("uniform resource locator") that can be read and used to launch web applications on the reader devices. QR Codes also have built in error checking that allows for branding on the QR Code itself.

At present, for consumers (or other interested parties or constituents) to view information about a purchased product and to link to data concerning that product they must manually navigate to a particular website and enter information containing the product's model and serial numbers. This method of accessing and linking product information is inefficient and requires consumers to locate both the model and serial number for a product and then to perform a series of cumbersome data entry operations.

Additionally, most systems for viewing product information and for linking consumers to products they have purchased do not provide information about the specific product purchased. Although discussed in terms of consumers it should be understood that the explanations are exemplary and apply equally to any constituent or interested party, e.g., service technician. Rather, most systems provide general information about a product model or type. Not providing information about the specific product purchased hinders a consumer's ability to make decisions about ordering replacement parts and determining the exact specifications of the product. Also, a consumer that is not able to see information about their specific product will not be able to track the service history for the product and will not be able to see any customizations or modifications that have been done to the product.

Furthermore, systems that do exist do not provide an easy method for other parties, such as installers, field technicians, and customer service representatives to view and modify information pertaining to a specific customer and that customer's product. These parties do not have a system that would allow them to order parts, create service orders, check warranty claims, and view customer information all from one information system. For example, service personnel cannot easily identify necessary measurement or other characteristics of the product which hinders post-purchase support and adds cost at every stage of the process.

Yet another problem faced by installers and field technicians is that they are not able to easily retrieve product specific installation instructions and record any modifications made during installation or repair. There is no system that gives installers and technicians the ability to record all parts ordered and changes made to a product and to further link those changes to a customer's specific product. Technicians and installers also lack the ability to track prior installations and service orders related to a specific customer and that customer's product.

What is needed is a system that allows for easy linking and retrieval of information pertaining to a specific customer and the product purchased by that customer. Ideally this information could also be modified and accessed by parties such as the customer, installers, field technicians, and customer service representatives.

What is also needed is a system that captures post-purchase data related to identified individual products to enable engineering, marketing, servicing, ordering, and other aspects of an enterprise to more effectively market and support its products across a broad and diverse, geographic and otherwise, market.

SUMMARY OF THE INVENTION

The present invention provides a system and method for associating many different data types with a specific product using a unique identifier contained in a unique identification tag that can be used in a product identification process. The information may be maintained and supplemented over time to enable enhanced support and service and decision-making by an enterprise. For example, a consumer or purchaser of the product may read a code, label or other mechanism attached to or otherwise accompanying the product to access further information concerning the product and/or to access additional services, e.g., ordering parts or requesting a service call to fix or replace a damaged or inoperative product. For example, a QR Code or other matrix or other code may be included or affixed to a window in a home and the homeowner may use a code reader application on a cell phone or the like to read the code. In doing so, the homeowner may link to a web page or web form via a network connection, e.g., Internet, based on data contained on the QR Code of the product. The homeowner may be presented with a user interface GUI screen or the like that enables a login process to a web site associated with the product, e.g., the manufacturer or distributer of the product. The manufacturer web site or server may, based on a unique identifier associated with the product and the QR Code, automatically identify a record associated with the product and thereby identify the product by type and size and other dimensions and parameters. For example, if the product is a window, then during manufacturing the QR Code affixed to the individual window is also associated with a record that may include the type of window, dimensions of the window, hardware associated with the window, etc. If the window was part of a particular order for a home construction then the record may also include the date the window was installed and the time frame in which warranty is in effect. The record may also include information related to the home builder and/or the homeowner. Further, where the record includes contact information for the owner of the building or product, e.g., an email of a homeowner, then the system may be adapted to communicate offers for supplemental warranty. For instance, if the product is a refrigerator or other appliance ordered for installation in a new home, then the system may send an email to the homeowner in advance of the warranty period running out and offering a new warranty plan for the appliance.

In one embodiment, the invention may provide a system that captures post-purchase data related to identified individual products to enable engineering, marketing, servicing, ordering, and other aspects of an enterprise to more effectively market and support its products across a broad and diverse, geographic and otherwise, market. For instance, a window company that sells multiple types of windows may learn over time that it has experienced a disproportionate number of service calls for a certain type of window product installed in northern states as opposed to the same window type installed in southern states. Based on this data the window manufacturer may determine that windows of certain type are better suited for certain climates than other types and may shift its marketing efforts and/or offerings to drive sales of certain a window type in those states in which it is better suited or may change its pricing structure based on geography to reflect additional service costs.

As used herein "attached" refers to any method of affixing, adhering, coating, printing, embedding, embossing, engraving, or otherwise placing unique identification tag on a product, device or component and "attached" or "attaching" should be given broad meaning in the context of the present invention. Furthermore, as used herein "tag" refers to any sticker, label, chip, or printed, engraved, or embossed symbol attached to a product, device or component and capable of being read or viewed by a device or capable of giving off, or receiving, an electronic signal capable of being sensed and interpreted and should be given broad meaning in the context of the present invention.

In a first embodiment, the present invention provides for a computer-implemented method for associating a unique identifier with a unique record relating to an individual product, the method comprising: generating a unique identifier associated with an individual product; attaching a machine readable unique identification tag to the individual product, the unique identification tag being associated with the unique identifier; associating the unique identifier with a unique record; storing the association and the unique record; at a time subsequent to the prior steps, receiving a signal comprising the unique identifier and having been generated remotely by a device reading the unique identification tag; and generating, responsive to the signal, a user interface for display at the device. Further aspects of this first embodiment include: that the unique identification tag is a two dimensional barcode, wherein the two dimensional barcode may be selected from a group consisting of a QR Code, a Microsoft High Capacity Color Barcode, an Aztec Code, a SPARQCode, a MaxiCode, and a DataMatrix. In addition, the unique identification tag may be a wireless non-contact identification tag, which may be selected from a group consisting of an RFID tag and an NFC tag. In addition, the unique record may comprise at least one of the group consisting of: contact information, geographic information, homeowner information, building information, warranty information, product information, manufacturer information, builder information, and installation information. Further, the method may comprise adding information related to the individual product at the time the individual product is manufactured, the information included with the unique identifier may include at least a URL address and a unique product identifier concatenated onto the URL address. The method may further comprise receiving, via the user interface, a service request related to the individual product and the unique identifier, and may further comprise: receiving, via the user interface, a selected set of data from the unique record to be analyzed; receiving, via the user interface, a selected set of criteria to use in analyzing the set of data; and generating a set of information based on the set of data and the set of criteria for display via the user interface.

In a second embodiment the present invention provides a system comprising: unique identification tag means for generating a unique identifier and associating the unique identifier with an individual product; means for attaching a machine readable unique identification tag to the individual product, the unique identification tag being associated with the unique identifier; means for associating the unique identifier with a unique record; a product information database for storing the unique record and the association between the unique identifier and the unique record; an input adapted to receive a signal comprising the unique identifier, the signal having been generated remotely by a device reading the unique identification tag; and means, responsive to the signal, for generating a user interface for display via the remote device.

In a simplified embodiment the process of the invention starts on the manufacturing floor. As a product is being manufactured, a unique label consisting of unique identification information is affixed to the product. This label contains information that will allow a scanning device to connect to a server or other networked device using the unique identification information for the individual product and its exact configuration. Different constituents or individuals will be able to interact with the system in different ways.

Each constituent will scan the label and receive a menu that supports the functions that their particular constituent group requires. Different functions could be implemented that would utilize product, manufacturer, and customer information and provide post installation support, post installation purchases and on-premise service requests. The constituent will then select the function they wish to perform.

A benefit of the invention is how the process ties together the constituent and their contact information, manufacturing information and the product's configuration to bring a full, rich and efficient experience to all business transactions. These value-added services are offered through the unique identification information are a means of differentiating even the most commodity-type product from other products in the same market.

The preferred embodiment of the invention would use a machine readable radio or visual tag as a unique product identification tag. The unique identification tag would contain unique identification information relating to an individual product. The unique identification tag would also contain information, such as a URL, that would direct a reader or scanner to a web page or program that would allow for the retrieval of information or for the performance of various functions. A scanning device such as a mobile phone or tablet computer would be used to read the unique identification tag on the product. The unique identification information on the unique identification tag would direct the scanning device to a primary server, e.g. a web server. The web server would use the information to retrieve a record stored on a database. The record on the database would then be used by the web server to create a set of customized web forms. The forms would then be used by the scanning device to retrieve specific information or perform functions such as ordering parts, creating a service order, or viewing product information. The customized forms or information allow the constituent performing the scan to view the information or execute a function using the customized form. This embodiment of the invention could use any combination of active or passive unique product identification tag and an active or passive scanning device.

One embodiment of the invention could use a QR Code as the unique identification tag. An alternate embodiment could use other means for the unique identification tag including a MICROSOFT HIGH CAPACITY COLOR BARCODE® ("HCCB"). The use of a HCCB could allow for the storage of the same type of information as a QR Code, including a serialized product number and a URL or other code to direct the reader to specific web page or program. Other two-dimensional bar codes capable of storing a sufficient amount of information, such as DataMatrix, Aztec Code, MaxiCode, or SPARQCode can also be used.

Yet another alternate embodiment could use non-visual means for the unique identification tag. Such means could include a radio frequency identification tag ("RFID"). A radio frequency identification tag is an unpowered antenna and storage device that when put in proximity with a powered scanning device sends out the information stored on the tag. In the present invention, an RFID tag could be used to store a product's unique identifier or other information about the individual product. The RFID tag could be either a low-frequency radio identification ("LowFID") tag operating between 125-134.2 kHz and 140-148.5 kHz or a high-frequency radio identification ("HighFID") tag operating at 13.56 MHz. The RFID tag could also include short range device tags in the 433 MHz (UHF) range, industry, scientific and medical ("ISM") band tags in the 800 MHz-1000 MHz range, ISM band tags in the 2400-5800 MHz range, and ultra wide band tags in the 3.1-10 GHz range. Additionally, any other radio frequency identification tag operating at any frequency and capable of functioning either actively or passively could be used. A variation on this embodiment could employ Near Field Communications ("NFC") tags and devices in place of RFID tags and devices. The use of NFC could also allow for configurable tags if both the NFC tag and NFC reader device were powered.

Another method of implementing the invention would be to provide product specific information in a unique identification tag. Placing the actual data on the unique identification tag, instead of using a unique pointer that allows a scanning device to connect to a web server to retrieve the data, allows for faster retrieval of information that does not require a connection to a network. However, the amount of data that can be stored in a unique identification tag is limited by the unique identification tag's storage capacity. Additionally, the data stored on the unique identification tag, or the URL linked to the unique identifier on the unique identification tag, can be programmed to expire at a certain point in time, which simplifies the process of disassociating the unique identification tag with its corresponding unique record.

The use of a unique identification tag is a significant improvement over current methods of identifying products including using serial numbers or bar codes. A serial number or bar code can identify a product, but cannot: provide for self service capabilities to the person scanning the code; tie together manufacturing data, configuration data, and on-site scanner data; launch specific applications based on product configuration and deliver this information to a general user; or tie together each constituent with a product through the product's entire life cycle.

The invention overcomes many problems faced by the different constituents involved in the manufacturing, purchasing, installing, and maintaining of a product. An owner of a product will need access to product literature and specifications, but will often be unable to locate literature specific to their individual product. The invention provides a way for product literature and specifications to be available through scanning of a unique identification tag on the product. Product literature can actually be customized based on configuration options unique to equipment in the home due to the invention's ability to uniquely identify individual products using unique identification information associated with a database record.

An owner may also find that the registration for their product is missing or incomplete and would desire to complete this information. The invention will automate current warranty and registration processes through the use of QR Codes. The invention will tie the individual product to the actual production order and to the owner who placed the order. Additionally, registering a single product from a multi-product order could register all products on the ordering making the process more efficient for all parties involved.

An owner may also face a situation where the identity of the product or the product's configuration is unknown to the owner. Many in-home or in-office products cannot be physically tagged with a brand name, make, or model. The invention, using a unique identification tag, could identify manufacturer, product, make and model in addition to providing a customized bill of materials. For example, if a homeowner who had purchased a window that was identified with a unique identification tag became concerned about the energy efficiency or any other aspect of the window, the owner could scan the unique identification tag and be able to determine the energy efficiency rating or other information about the owner's individual window. Furthermore, a homeowner who did not purchase the individual product that had been previously installed could scan the unique identification tag to learn about the information related to the individual product and its unique configuration.

An owner may also be confronted with a situation where a part or service for a product they own is difficult to identify or obtain. An owner may wish to replace a worn part or add additional capability to an on-site product. The invention allows for a scanning of a unique identification tag to assist in the purchase of a part or service that will fit the owner's individual product. The invention provides a web site that will inform the owner of the correct part or service and will also allow the owner to place an order and make an electronic payment. For example, if an owner scans a unique identification tag and the owner discovers that the product's warranty will soon expire, the invention allows the manufacturer or service organization to purchase a warranty based on the owner's product configuration and age.

The owner of product labeled with a unique identification tag could also use the invention to register an unregistered product or determine the warranty status of the product. The same information could also be accessed by other constituents, including customer service representatives or field technicians.

The invention also allows an owner to use the unique identification tag to look up the information associated with their product to determine the maintenance requirements for the individual product and receive notifications regarding additional maintenance or product recalls. By having the exact product registered though the unique identification tag and associated with the product's owner, the invention allows the manufacturer or service organization to send maintenance reminders or recall notices to only those owners that are pertinent to the reminder or notice. The invention allows a manufacturer that has discovered an issue with a particular product that has a certain configuration to send a notification to only those owners that own the product in the configuration related to the issue.

Once an issue has been discovered, or if there is ever a problem with a product, the invention allows an owner to submit a service request for an individual product by scanning the unique identification tag. The invention's self service capability saves effort by the owner and service entry costs for the manufacturer or service organization. Additionally, this invention facilitates communication between the parties.

A customer may also wish to place an order for a part for a product using the present invention. The process starts with the on-site constituent interacting with the invention. In the case of an on-site order placed by a customer, it will normally be the 'owner' scanning the unique identification tag with a smart phone or tablet device. This scan will launch a web application that will enable the constituent to navigate to a purchasing screen. The purchasing screen will be customized to provide options/services that are related to the item scanned. This may be consumables, replacement parts or even an extended warranty. All items presented are customized for the actual product scanned. There is no need to measure, match or reconcile any information presented. Again, the information required to make a purchase will be merged with the serialized database to provide a customized experience for the scanned product.

The invention also solves problems encountered by installation crews and service technicians. An installer could use the invention to scan a unique identification tag to access product literature and specification related to an individual product. The literature and specifications can be customized by either the manufacturer or installer based on configuration options unique to the product. If the installer encounters any issues or unique conditions while installing the product, the invention also allows the installer to use the unique identification tag to access installation trouble-shooting documents, videos, or other media associated with the individual product.

A service technician encounters other unique issues addressed by the invention. If a service technician is servicing a configured product in a home or office, the invention allows the technician to scan the unique identification tag to retrieve the exact product configuration of the product being serviced. The service technician could be scheduled for on-site service either by a product owner reading information directly from a unique identification tag to a customer service representative, or by scanning the unique identification tag and using the invention to schedule a service call. The technician can also use this information to prepare for a service call before going on-site. Use of the invention greatly increases the likelihood of a one trip fix by allowing the technician to order parts and prepare for the service call before going on-site. This allows the service organization to improve the first time resolution percentage, saving costs and product owner hassle by eliminating the need for multiple trips and reducing the duration of service outages.

Once on-site, the invention will give a service technician the ability to troubleshoot a specific problem. The invention allows the technician to scan the unique identification tag and then presents the technician with service remedies suggested through the history of failures associated to like products. For example, if a window is not performing to specification, the technician will receive notification that a particular item on the window has a history of failure or is subject to recall, speeding the technician to a resolution of the issue.

The invention will also provide a service technician or customer service representative with the complete service history for any product. The service history associated with an on-site product will be tied to the unique identification tag and made available to the service organization.

The invention can also be used as a data gathering and analysis tool to provide information to different constituents on many aspects of the manufacturing, sales, installation, and repair processes for any product type. The scanning device used in the present invention could also employ a GPS tagging method to enable the device to mark, using a GPS tag, the location of any service, repair, installation, or other activity related to an individual product. The invention allows for the tracking of any issues, recalls, or service calls for any product type. The invention also allows for the tracking of product sales and services calls linked to specific geographic areas. The use of unique identification tag allows service calls, recalls, sales, and other repairs to be associated with individual products, customers, and geographic areas.

Manufacturers and service organizations can use the information linked with individual products or product types to determine what models are selling best in particular geographic areas, how often and what type of service certain models need in particular geographic areas, and what models and types of service are unpopular in particular geographic areas. The data provided by the invention can be used in developing product designs, sales, service, and marking strategies. The present invention provides an advantage when a product is sold through multi-step distribution channels because it allows for detailed information to be recorded and associated with an individual product through every step of the process.

In addition to overcoming the aforementioned problems, the invention also provides a suite of features to each constituent based on the type of product and the constituent performing the scan of the unique identification tag on the product. The invention allows a product owner access to, for example: self service product registration including express order registration, contact information, and GPS tagging; warranty status; contact information for manufacturer or service agent; product make, model and options; product literature customized to an individual product and its options; product specifications customized to an individual product and its options; a troubleshooting guide including multimedia customized to an individual product and its options; a product maintenance schedule customized to an individual product and its options; the ability to order or purchase parts and services including electronic payment; self-service maintenance requests; product energy ratings; recall notifications; and the ability to link product information with third party services.

The invention gives an installer access to, for example: product literature customized to an individual product and its options; installation guides customized to an individual product and its options; installation videos customized to an individual product and its options; troubleshooting guides including multimedia customized to an individual product and its options; and product registration services.

The invention further allows a field service technician access to, for example: directions to the service site obtained using product registration information; paperless service requests and data entry; service scheduling and communication with a product owner; product literature requests customized to an individual product and its options; troubleshooting guides including multimedia customized to an individual product and its options; product registration services; product maintenance history; recall notification alerts; and payment remittance.

The invention also allows a customer service representative or organization access to, for example: parts lists and orders that can be sent to a field technician; customer communications tools; warranty information including order and product type tied to a serialized QR Code; multimedia information related to a customer or technician submitted service order; and current customer contact information.

The invention also provides for more than one scanner type. A generic utility scanner or scanning device may be used and would consist of unique identification tag reader software on a cell phone, tablet computer, handheld computer or similar device. A modified scanner may also be used for specific constituents. The use of a modified scanner allows for the restriction of access to certain information to the generic utility scanner while providing full access and additional functionality to the modified scanner.

The invention can be used with any product that receives an individualized serial number or similar unique identifier. The unique identification tags can be sent with or affixed on any product type. The use of unique identification tags is especially beneficial for any product that may need warranty information, service information, customer information, customizations, installation instructions, or general product information associated with individual products and product owners.

The present invention's method of linking an individual product to a unique identifier may also be used for the tracking of the contents of shipping containers, train cars, or any other shipping means on which a unique identification tag could be affixed. In this embodiment the unique identification tag, in any form described herein, would be attached to the container such that it could be easily read by a scanning device. When scanned, the scanning device would extract the unique identification information, in the form of a unique identifier concatenated onto a URL, from the unique identification tag. The truncated unique identifier and URL would direct the scanning device to a user interface that was generated by a primary server responsive to the unique identifier and URL, the information for the user interface coming from a shipping information database. The user interface would be a web form with information and features related to the individual container. The interface could provide the contents of the container, the destination of the container, the cost of the shipment, and any customs, tariff, or other fee information. The interface would also allow a user to change or modify this information using either the scanning device or any other computer connected to the primary server.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a system and method for associating many different data types with a specific product using a unique identifier contained in a unique identification tag that can be used in a product identification process. The unique identifier can be either a serialized identifier, a license plate type identifier, or any other means of identifying a product using ASCII type alphanumeric characters or symbols.

Figure 1:
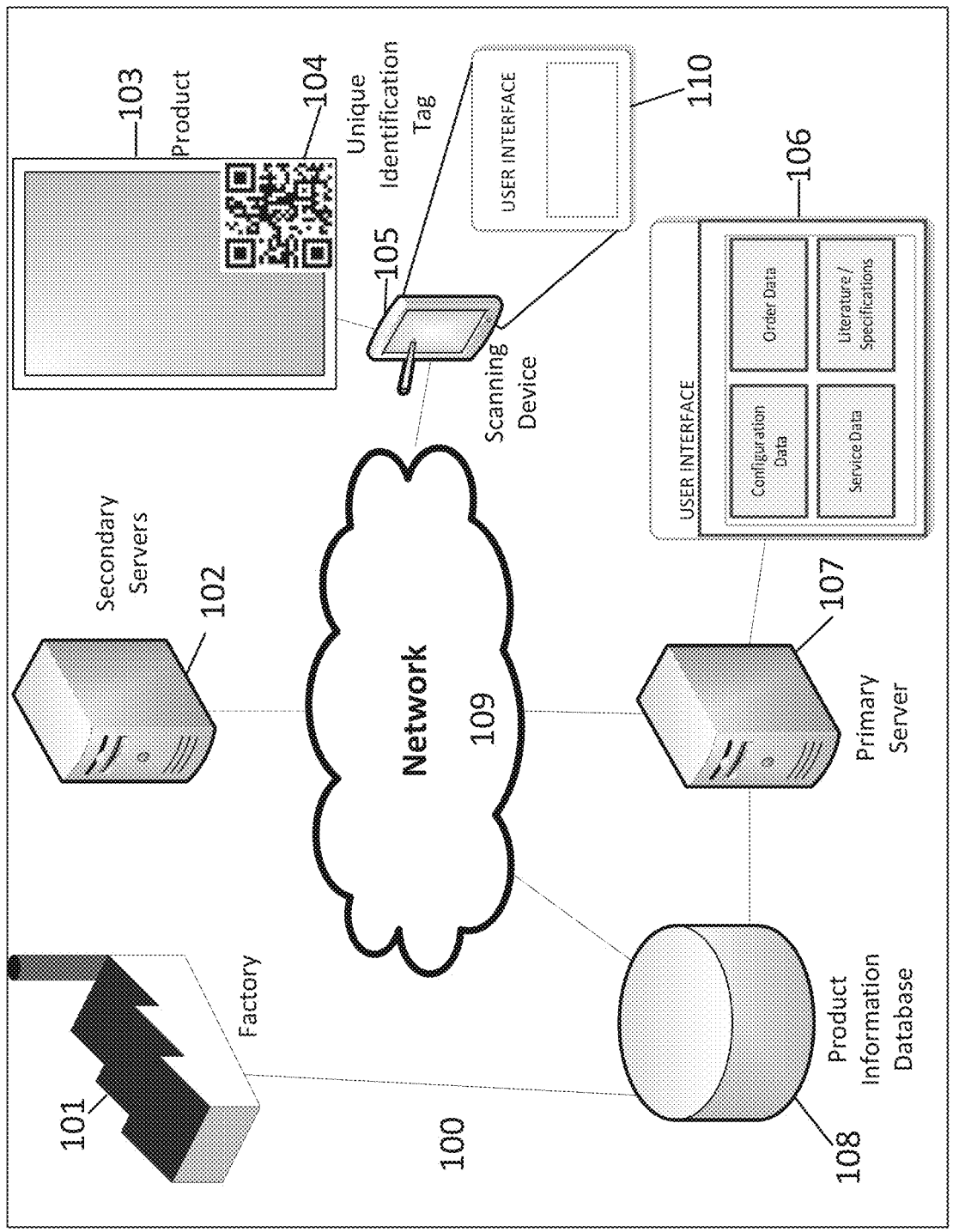
FIG. 1 is a simplified network diagram of the components involved in the system.

Referring now to FIG. 1, the claimed process may be carried out in conjunction with the combination of hardware and software and communications networking illustrated in the form of exemplary system 100. The system 100 is provided for the creating, associating, storing, reading and display of information related to product 103 by unique identification tag 104. Product 103 can be any consumer product, preferably one that requires on-site installation and maintenance and could include: windows, refrigerators, ovens, doors, sinks, microwaves, air conditioners, furnaces, or any other home appliance. The unique identification tag 104 could be a QR Code, Microsoft® HCCB, DataMatrix, Aztec Code, MaxiCode, or SPARQCode. In a different embodiment, the unique identification tag could be an RFID tag or NFC tag. All components of system 100 are connected through network 109 which could be any wired or wireless network, e.g. the internet or a private intranet.

The product 103 is manufactured at factory 101. At the time of manufacturing, a unique identification tag 104 is created for product 103. The unique identification tag 104 is stored in product information database 108. At this time, unique identification tag 104 is associated with a unique identifier, product information, customer information, and other information related to the product 103.

Once the association between product 103 and unique identification tag 104 has been stored in product information database 108, scanning device 105 can be used to scan unique identification tag 104 to begin the process of retrieving information from product information database 108 related to product 103. Scanning device 105 can be any device adapted to read a QR Code, any other two dimensional barcode capable of storing information, or a radio identification tag such as an RFID tag. Preferably, scanning device 105 is a tablet computer, mobile phone, or handheld computer with a camera and software adapted to read and use QR Codes, but could also be any other device, including specially adapted scanning devices, capable of scanning a two dimensional barcode or reading an RFID tag.

A scan of unique identification tag 104 by scanning device 105 would be sent to primary server 107. Primary server 107 will use the scanned information sent from scanning device 105 to retrieve information linked to product 103 from product information database 108. Primary server 107 will then use the information retrieved from product information database 108 to contextually generate user interface 106 based on the unique identifier. After generation, user interface 106 will be sent to scanning device 105 to be displayed on the scanning device's user interface 110.

User interface 106 is generated using information about the context of the scan performed by scanning device 105 in conjunction with the unique identifier contained on unique identification tag 104 and other information associated with product 103. For example, the product's unique identifier could be concatenated with a URL address to be used to both locate the unique record associated with the product and contextually generate user interface 106. The information is retrieved from product information database 108 using the unique identifier found on unique identification tag 104. Once scanning device 105 has received user interface 106 from primary server 107, scanning device 105 uses user interface 106 to send additional commands and requests to primary server 107.

Additional servers 102 may also be part of system 100 and if included in the system, would provide additional information or process requests that primary server 107 cannot provide.

The configuration thus described in this example is one of many and is not limiting as to the invention. Central system 100 may include a network of servers, computers and databases, such as over one or more LAN, WLAN, Ethernet, token ring, FDDI ring or other communications network infrastructures. Any of several suitable communication links are available, such as one or a combination of wireless, LAN, WLAN, ISDN, X.25, DSL, and ATM type networks, for example. Software to perform functions associated with system 101 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

Figure 2:
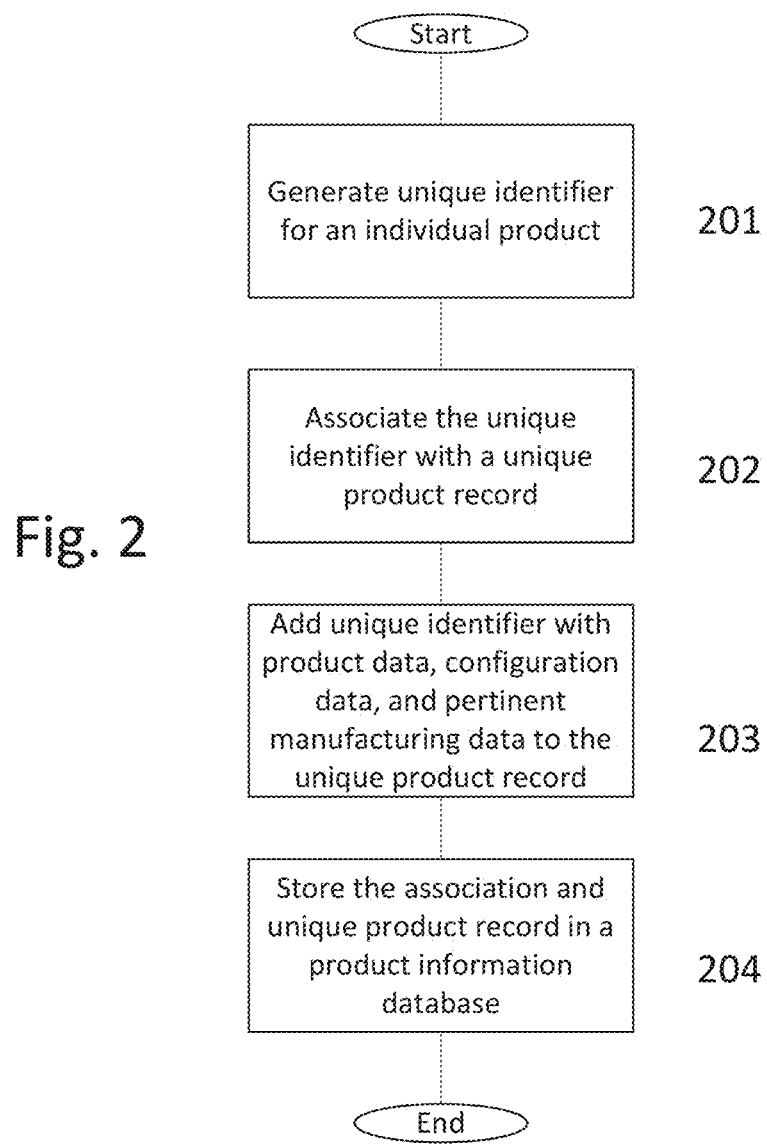
FIG. 2 is a flowchart of the steps involved in the creation and initial association of unique identifier with a product.
Figure 3:
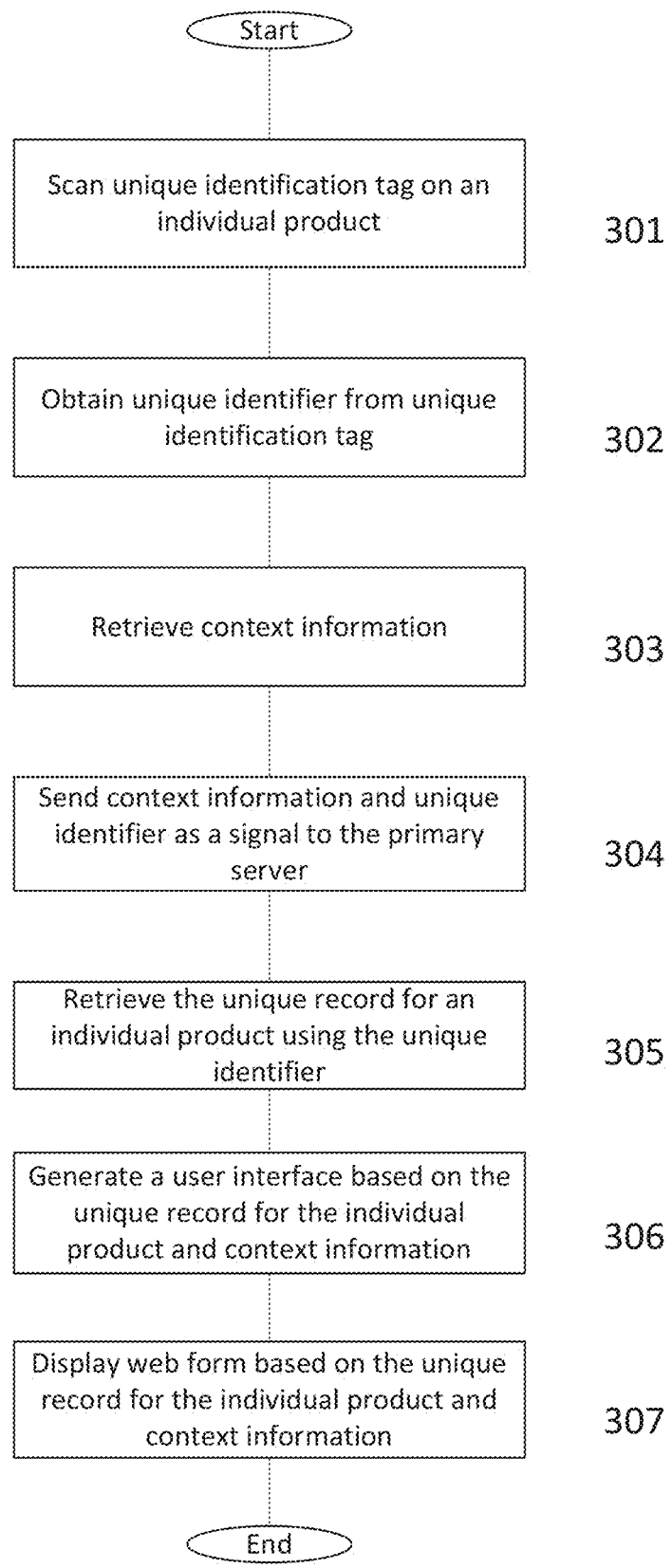
FIG. 3 is a flowchart of the steps involved in the scanning of a unique identification tag and the retrieval and display of information associated with the unique identification tag.

FIGS. 2 and 3 illustrate in greater detail one embodiment of the present invention. With reference to FIG. 2, a process is provided for creating an association between a unique product identifier and a database record. The process starts during manufacturing. When a product is manufactured a unique identifier is generated for that individual product at step 201. This unique identifier contains information specific to the individual product being manufactured. The unique identifier can be either a serialized identifier, a license plate type identifier, or any other means of identifying a product using ASCII type alphanumeric characters or symbols. The unique identifier is then associated with a unique product record in step 202. The record will only be used for the individual product associated with the unique identifier.

At the time the association between the unique identifier and the unique record is made, additional information can be added at step 203. Additional information may not always be available at the time the product is manufactured; however, if such information is available it can be added to the unique record at this time. Additional information that could be added to the unique record can include any of customer information, builder information, warranty information, installation instructions, installation videos, self-help information, troubleshooting videos, product specifications, GPS information, other multimedia related to the product, or any other information available that the manufacturer wishes to associate with the product.

The additional information added to the unique record could come from one of any number of sources including the manufacturer, a user's scanning device, a service technician or installer's scanning device, or from a customer service provider. The manufacturer could add information to the unique record including, but not limited to: a unique identifier; the product make or model; the product configuration options; a bill of materials; a date of manufacture; order and shipping dates; customer information; product information; marketing information; product quality issues; warranty information; and maintenance requirements. A scanning device or similar smart device could be used for data collection and could also be used to add information such as GPS location or photos to the unique record. An installer or service technician using a scanning device or similar smart device could add information including installation history, service history, inspection information, trouble reports, and photographic records to the unique record. A homeowner, product owner, or building owner could add information using a scanning device or similar smart device including, for example, contact information, product installation location, purchase information, purchase requests, trouble reports, or photographic records to the unique record.

Once a unique identifier has been generated and associated with a unique product record, and any additional information has been added to the unique product record, the unique product record is stored in step 204. The unique product record and the association between the unique product record and the unique identifier are stored in a product information database that contains all of the records for either a particular manufacturer or for a particular product model or product line.

With reference to FIG. 3, a process is provided for scanning a unique identification tag and providing information based on the scan. In step 301a scanning device is used to scan the unique identification tag that is located on an individual product. The unique identification tag is one that would have been placed on the product at the time of manufacture and contains unique identification information. The tag would also contain additional information, such as a URL, that would allow the scanning device to locate information about the individual product.

Once the product has been scanned, the scanning device obtains the unique identifier from the scanned unique identification tag in step 302. The scanning device will interpret the unique identification tag to obtain the unique identification information and URL or other information to locate the unique record associated with the product. Before the scanned information is sent the scanning device will perform step 303, wherein it will retrieve additional context information to be sent along with the scanned information. The context information includes information about who is performing the scan, where the scan is being performed, the device being used to perform the scan, or the software being used to perform the scan. The context information will not be used in retrieving the unique record, but will be used for the generation of a user interface to be sent back to the scanning device.

After the scan has been performed and the context information has been retrieved, the scanning device sends the information to the primary server in step 304. The primary server will then use the unique identifier to retrieve the unique record associated with the information from a database in step 305.

Once the primary server has received the unique record associated with the unique identifier, step 306 is performed. In step 306 the primary sever uses the information retrieved from the database in step 305 along with the context information received from the scanning device in step 304 to generate a user interface. The user interface generated in step 306 is specific to the context information, unique record, and unique identifier. After it has been generated in step 306, the user interface is sent to the scanning device in step 307.

Figure 4:
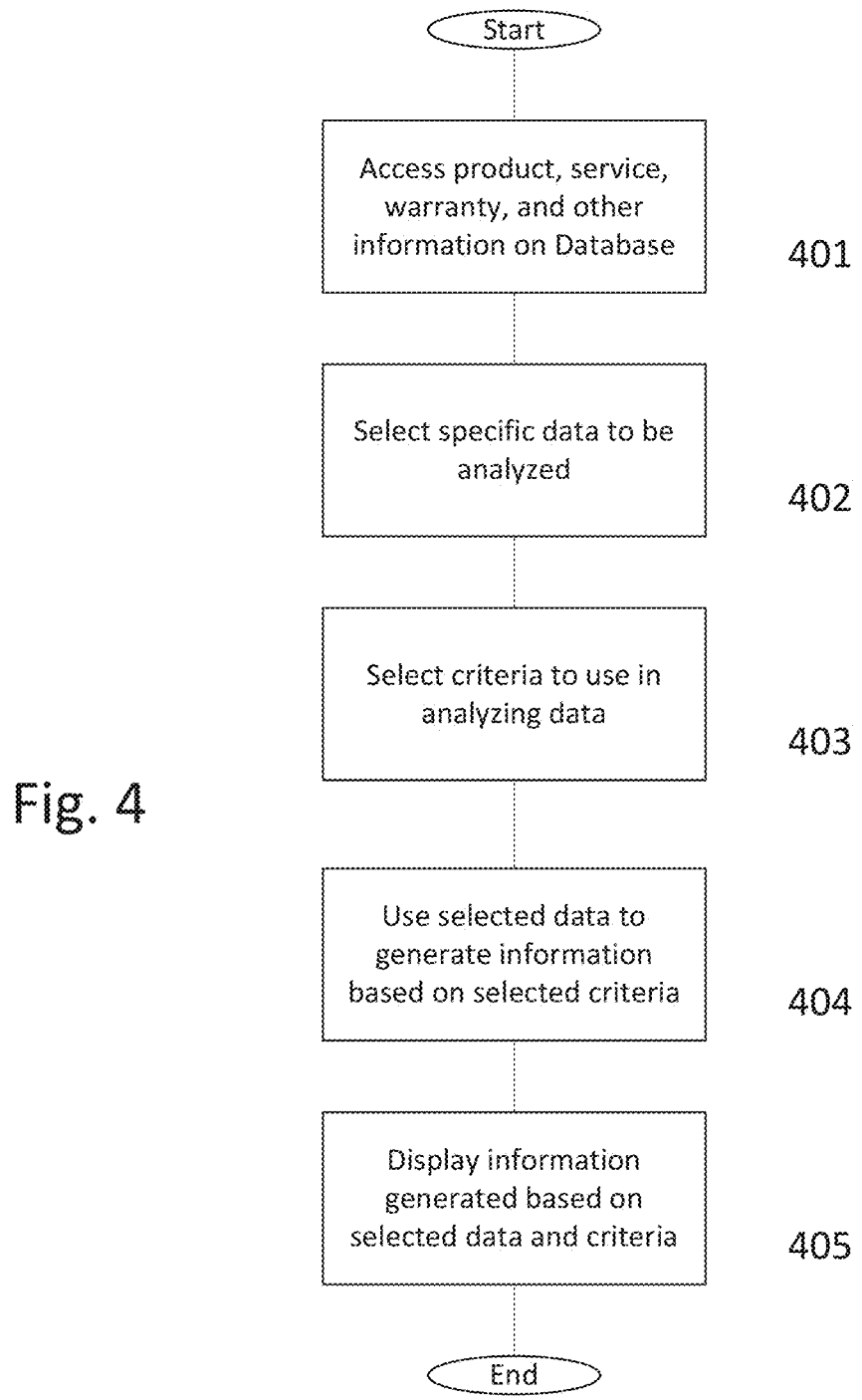
FIG. 4 is a flowchart of the steps involved in the process of retrieving specific data and generating an analysis of the data based on specific criteria.

With reference now to FIG. 4, a process is described for the creation of information to be used for varying purposes including product reliability, product popularity, repair frequency, and problem issue identification. In addition to the present invention being able to easily identify and associate information with an individual product for easy retrieval using a unique product identifier it can also be used to provide management or other individuals with top level information associated with a product line or product model.

After a unique record has been associated with a unique identifier and information has been added to the unique record in steps 201 through 204, the information can be accessed on the database where the record is stored using the primary server or any other computer connected through a network to the database. A user would access the information on the database in step 401 by either connecting to the database remotely or by using terminal physically connected with the database.

Once the information has been accessed, in step 402 the user selects the specific information they would like analyzed. The user then in step 403 selects a set of criteria to be used in the analysis of the information. After the user has selected the information to be analyzed in step 402 and has specified the set of criteria for the analysis in step 403, a set of analyzed information is generated in step 404. The information generated in step 404 can be used to, for example, identify what particular product models are popular in certain geographic areas. The information from step 404 could also show which product parts are failing most often for a product type, what repair types are most common for a product type, and what upgrades or options are most popular for a product type. This information can also be organized by geographic area, type of product, product cost, or other criteria specified by the user.

After the information has been generated in step 404 it is displayed to the user in step 405. The information can be displayed on a monitor in a raw, unprocessed form, in a spreadsheet for example, or could be processed into charts, graphs, or other data formats that could be more easily read and interpreted by a user.

Figure 5:
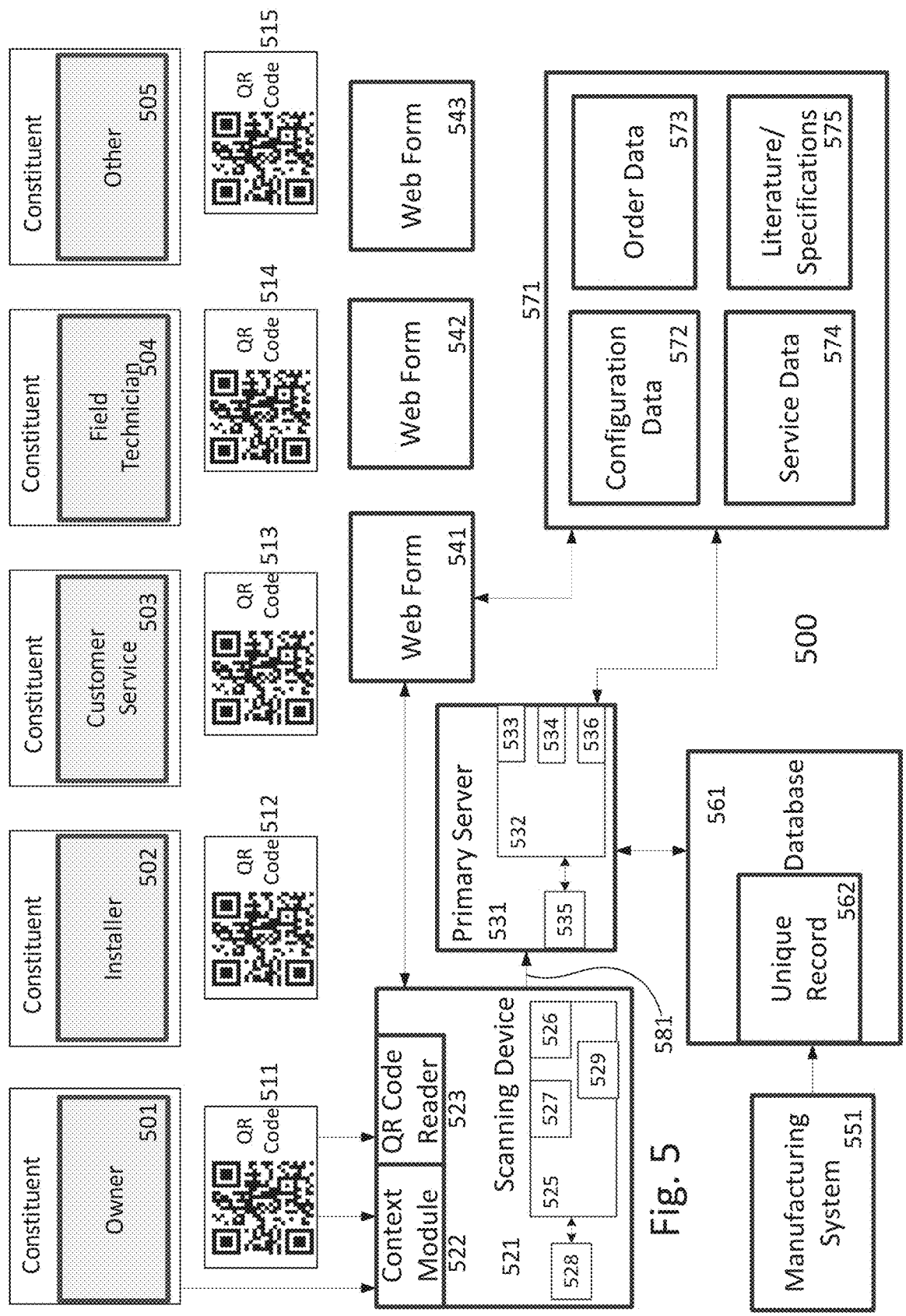
FIG. 5 is a detailed data-flow diagram depicting all system components and their flow of data between the components.

With reference now to FIG. 5, a detailed system diagram is provided to illustrate the flow of data for the above mentioned processes which may be carried out in conjunction with the combination of hardware and software and communications networking illustrated in the form of exemplary system 500.

The above processes, and as discussed in more detail below, may be carried out in conjunction with the combination of hardware and software and communications networking illustrated in the form of exemplary system 500. In this example, system 500 provides a system and method for associating many different data types with a specific product using a unique identifier contained in a unique identification tag that can be used in a product identification process. System 500 may be used in conjunction with a manufacturing or inventory management system, and in this example includes a primary server 531, a product information database 561 comprising a set of unique records 562, a scanning device 521 having as components a QR Code reader 523, and a context module 522. The primary server 531 may be accessed by scanning device 521, such as via a network connection 581, e.g., Internet. Aspects of the system 500 may be enabled using any combination of Internet or (World Wide) WEB-based, desktop-based, or application WEB-enabled components. The scanning device 521 in this example includes a GUI presented via web form 541 and is a mobile device, such as a cell phone, tablet computer, handheld computer or the like, that may comprise a typical combination of hardware and software including, as shown in respect to scanning device 521, system memory 525, operating system 526, graphical user interface (GUI) 527, processor 528, and storage 529. The primary server 531 in this example may comprise a typical combination of hardware and software including, as shown in respect to primary server 531, system memory 532, operating system 533, graphical user interface (GUI) 534, processor 535, and storage 536. The methods and systems of the present invention, described in detail hereafter, may be employed in providing remote users access to a searchable product information database 561. In particular, remote users may access the product information database using requests containing a product's unique identification information. Client side application software may be stored on machine-readable medium and comprising instructions executed, for example, by the processor 528 of scanning device 521, and presentation of web-based interface screens 541 through 543 facilitate the interaction between scanning device 521 and primary server 531. The operating system 526 should be suitable for use with the system 501 and browser functionality described herein, for example, iOS, Android operating system, Windows Mobile, or the like. The system may require the remote user or client machines to be compatible with minimum threshold levels of processing capabilities, minimal memory levels and other parameters.

The system 500 in FIG. 5 provides for constituents 501 through 505 that includes owner 501, installer 502, customer service 503, field technician 504, and other constituent 505. The system 500 also contains a set of unique identification tags in the form of QR Codes 511 through 515. The dataflow in this embodiment will be described in relation to constituent owner 501 and QR Code 511.

When QR Code 511 is read by scanning device 521, the unique identification information contained on the QR Code 511 is sent to the QR Code reader 523 portion and context module 522 portions of scanning device 521. At the same time the scanning device 521 reads QR Code 511, the scanning device 521 also reads any relevant context information, including who is performing the scan, in this case, constituent owner 501. After the QR Code 511 has been sent to scanning device 521, QR Code reader 523 reads the unique product identifier and other information from the QR Code 523.

The scanning device 521 then takes the information from the context module 522 and QR Code reader 523 and sends the information to primary server 531. Primary server 531 uses the information sent from scanning device 521 and uses the information to locate and read the unique record 562 associated with the unique identifier found on QR Code 511. The unique record 562 was stored on database 561 at the time the product associated with the unique record was manufactured. This data for the initial association along with the generated unique identifier is sent from the manufacturing system 551 to the database for storage. Alternatively the data could first be sent to primary server 531 which would then store the data on database 561.

The unique record 562 has now been located using the information provided to primary server 531 by scanning device 521. The unique record 562 is sent to primary server 531 where it is used to create user interface 571. User interface 571 is comprised of information such as configuration data 572, order data 573, service data 574, and product literature or specifications 575. The data to be displayed in user interface 571 is determined by the information from context module 522 and QR Code reader 523 that was sent to the primary server 531 in the initial request from the scanning device 521.

The user interface is thereafter tuned into a web form 541, which could take other variations 542 or 543 depending on the context information from the context module 522 and the unique identifier read by QR Code Reader 523. The form could also change or be generated fluidly based on further input from scanning device 521 or primary server 531. After the web form 541 has been generated it is sent to scanning device 521 where the user can view the information on the form or can input further commands.

Any commands from scanning device 521 are sent to primary server 531 through the web form 541 to be processed. Once a command has been received by primary server 531, a new web form 542 may be generated to responsive to the command sent form the scanning device 521.

Figure 6:
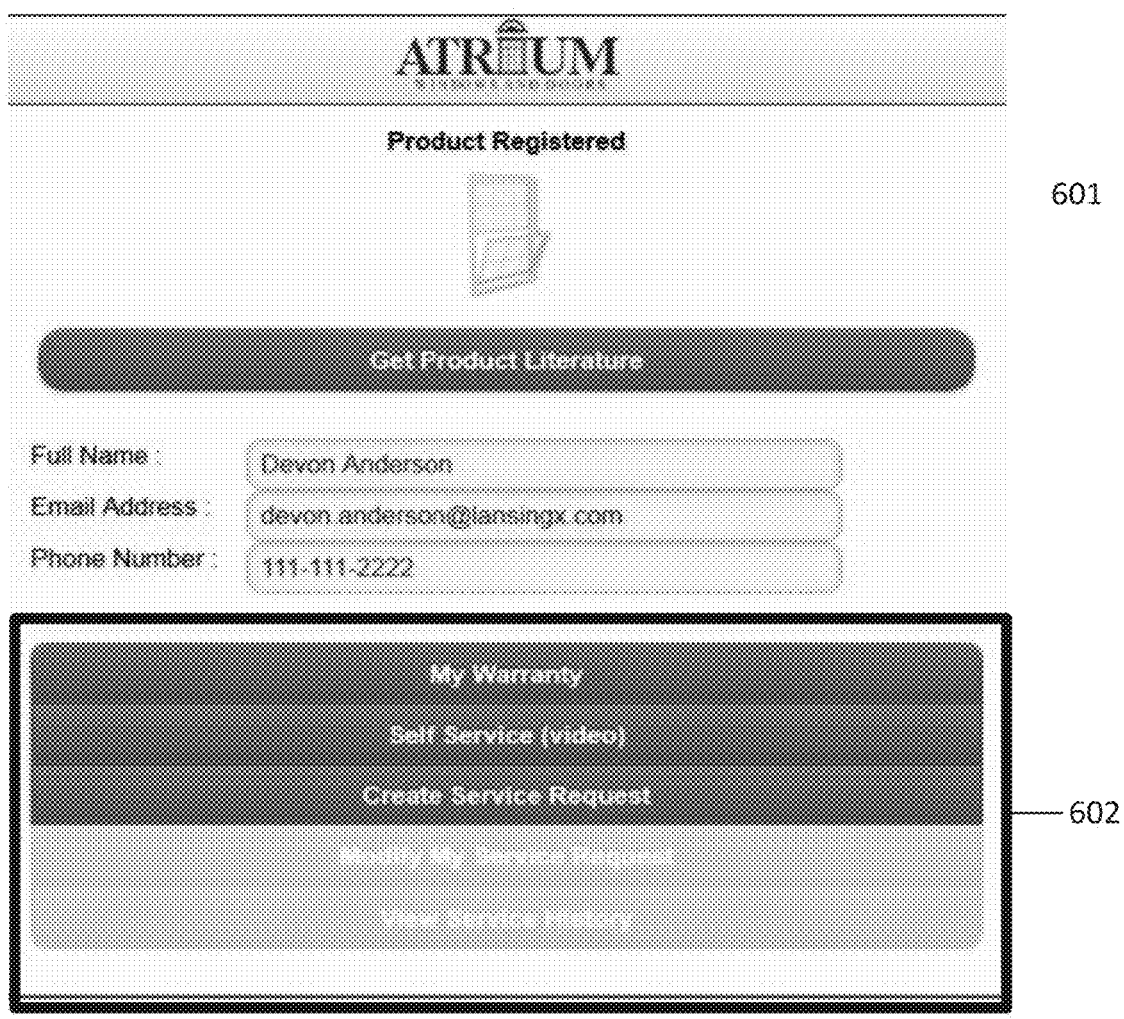
FIG. 6 is a screenshot of a web form from the user interface displaying basic product and owner information and further providing options for viewing warranty information, viewing self service media, and for creating a service request.
Figure 7:
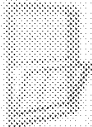
FIG. 7 is a screenshot of a web form from the user interface displaying a sample owner created service request for broken glass in a window product.
Figure 8:
FIG. 8 is a screenshot of a web form from the user interface displaying a message from a successfully created service request.

FIGS. 6 through 8 depict a series of screenshots from an example embodiment of the user interface for the present invention. The screenshots would appear as web forms, such as web form 541 in FIG. 5, and would be generated through the process described in reference to FIG. 5 hereinabove.

FIG. 6 is an example screenshot that shows what a customer or product owner would view when using the present invention. The entire area 601 shows the contact information associated with the product as well as a plurality of buttons that can be used to select certain functions. The customer information is retrieved using the unique identifier associated with the product and the unique record associated with the identifier.

The options displayed in area 602 will reflect the context information sent by the scanning device to the primary server. In this example, a product owner would be able to view the warranty information for their product, a self service video, or literature about their product. The owner would also be able to create a service request, and if one had already been created, would be able to modify an existing request or view prior service requests for the individual product. All of the information and options on this screen would reflect an individual product as well as the owner of the product and the user accessing the information. The screen would also differ based on other context information including the type of device being used to access the information, an Atrium modified device, for example. The use of a modified device, such as an Atrium modified device, would allow for easy control over what information was provided to which constituents.

With reference now to FIG. 7, a screenshot is provided displaying the input screen for a customer creating a service request using the option found in area 602 of FIG. 6. If a customer or other constituent wishes to create a service request, they would be presented with the screen in FIG. 7. All of the information on in each field would be pre-filled by the present invention due to the information being stored in a unique record associated to an individual product via a unique identifier used to locate the record. The user would only be required to select a reason for service and make any additional comments related to the service request. However, the user could also submit a photo, video, or other information or media related to the service request. The information could be both captured and submitted by the scanning device. Once made, the service request would be sent to the appropriate service organization associated with the product for further action. The product owner would be able to view or modify a request using the corresponding option from area 602 in FIG. 6.

With reference now to FIG. 8, once a service request has been created using the screen in FIG. 7, the user creating the service request will be presented with the screen found on FIG. 8. The screen would contain information such as a service request number and a time period in which the user will be contacted by a service organization or service technician. The information could alternatively be sent to the constituent through an email or a text notification.

Figure 9:
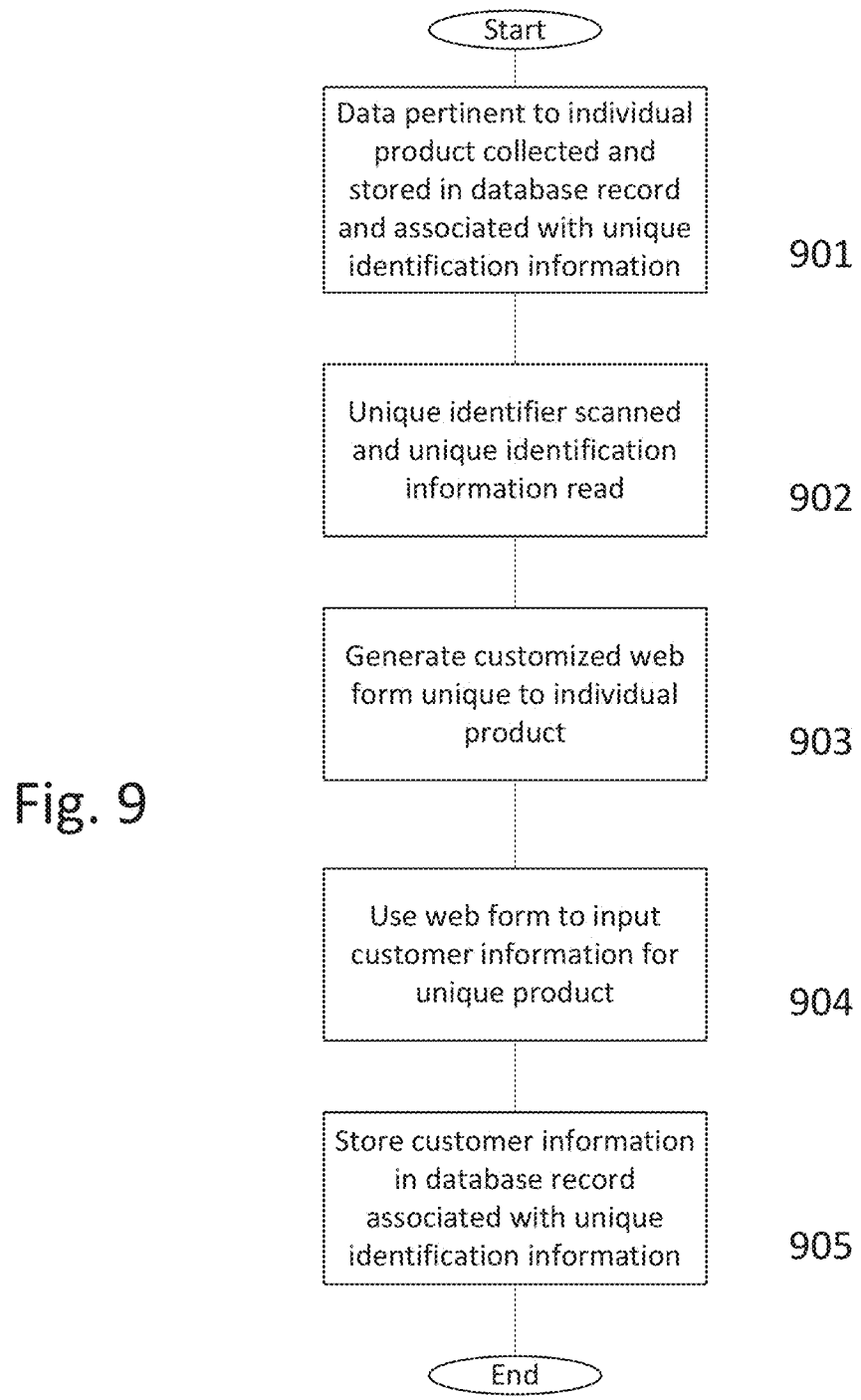
FIG. 9 is a flowchart of the steps involved in the process of registering an individual product and retrieving the registration information.

FIG. 9 depicts a flowchart for an example embodiment the product registration process. The process starts with the on-site constituent(s) interacting with the present invention. In the case of product registration it will normally be the 'owner' (someone acting on their behalf) or an installation person. The constituent will use standard smart device technology to launch the self service application.

Long before the registration process takes place, the manufacturer or service organization has been proactively preparing and collecting data about the product in step 901. At every step in the order fulfillment process (order entry, manufacturing, shipping, billing, installation, etc.) the data pertinent to the unique product is being collected. This data (product type, configuration option sets, manufacture date, in-service date. warranty information, etc.) is stored in a database and tied to the individual product. The key data element is a unique identifier assigned to every unique item.

During the manufacturing, installation or service process a two dimensional barcode, such as a QR Code, is attached to the product. This barcode contains information that references the data capture discussed in step 901 above and is referred to as the 'unique identification tag'. This unique identification tag allows the manufacturing or service organization to reference all of the pertinent order fulfillment information to provide 'after the sale' service, support and enables remote purchases through common technologies like smart phones, tablets (iPad), laptops and other computing devices. Additionally, all 'after the sale' service, support and purchases are captured and become available as additional information for future service, support and purchase.

The on-site constituent scans the unique identification tag in step 902 with their smart device or laptop. A user interface in the form of a web page is then generated using the information scanned from the unique identification tag along with context information in step 903. The user is then presented with a web page that is customized to the product/model that was scanned. All information collected during 'data capture' is now available to the constituent. For example: The constituent would know the exact product configuration and the corresponding warranty ramifications as part of the registration process. Additionally, any interaction with the constituent can be captured at the web application (name, address, email address for registration) and added to the previously collected data to further enhance the user experience with the product/manufacturer.

After scanning the serialized barcode, the constituent is presented with a menu to support all possible interactions the manufacturer or service organization want to enable in step 904. In the case of product registration, this would allow the constituent to register their product by entering contact information. Once a product is registered, the web application would then 'unlock' other features like allowing a service request through the web application. The manufacturer or service provider knows who bought the product (and where it is located) as well as the exact configuration of the product collected before registration. Any new information or interactions from the user would be stored in the database record associated with the product in step 905.

Figure 10:
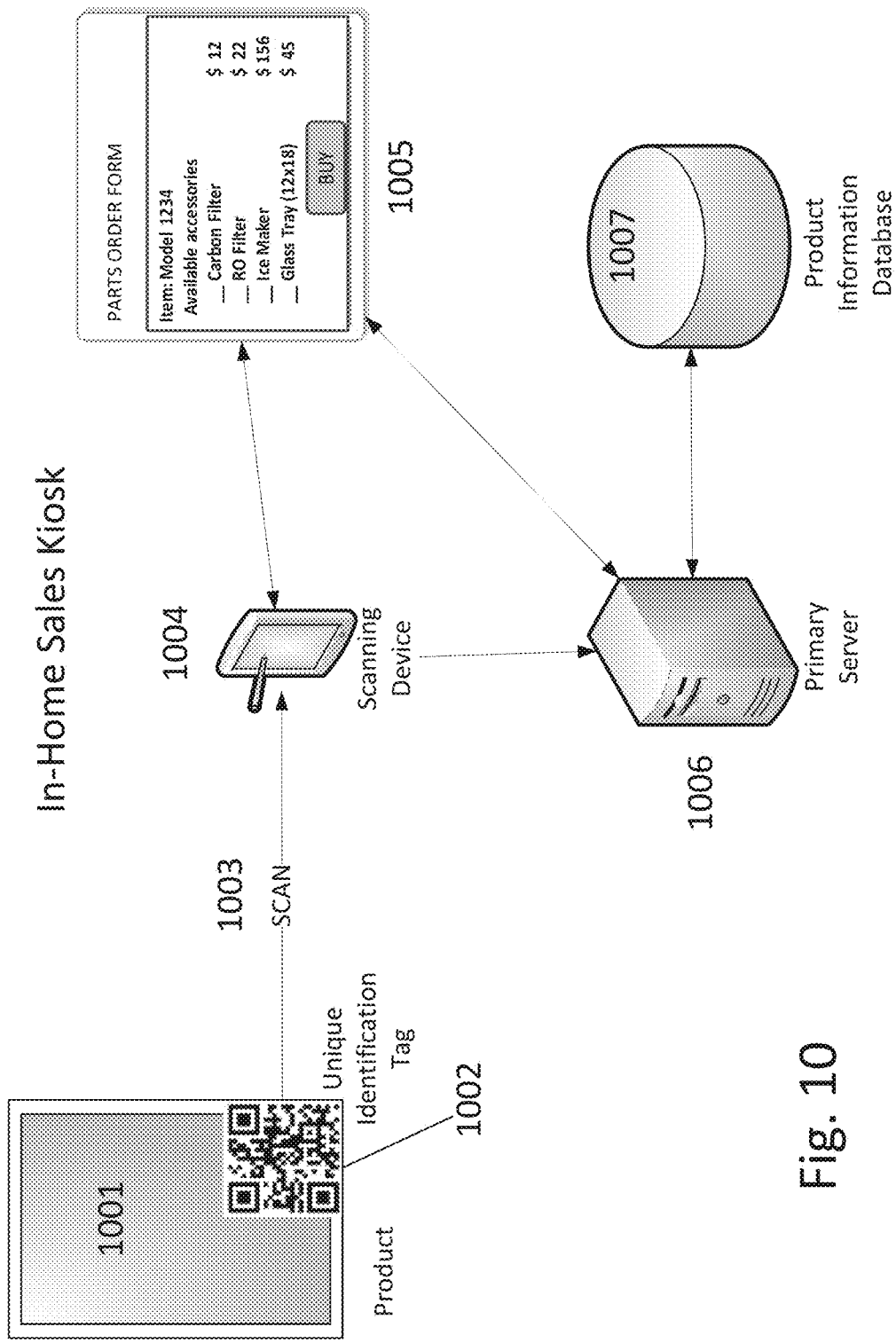
FIG. 10 is a simplified data flow diagram depicting the process of placing an order for a part for an individual product.

With reference now to FIG. 10, a system is provided to demonstrate an example embodiment of an on-site product purchase using the present invention. The process starts with the on-site constituent interacting with the present invention. In the case of the In-Home Sales Kiosk it will normally be the 'owner' scanning the unique identification tag 1002 on product 1001 with a scanning device 1004, such as smart phone or tablet device. This scan 1003 will launch a web application via primary server 1006 that will enable the constituent to navigate to a purchasing screen 1005.

This purchasing screen 1005 will be customized to provide options/services that are related to the item scanned. The information needed to generate the purchasing screen 1005 will be retrieved from a unique record associated with the unique identifier in the unique identification tag 1002 that is stored on product information database 1007. The options or services displayed on purchasing screen 1005 may be consumables, replacement parts or even an extended warranty. All items presented are customized for the actual product scanned. There is no need to measure, match or reconcile any information presented. Again, the information required to make a purchase will be merged with the unique record associated with the product's unique identifier on the database to provide a customized experience for the scanned product.

Figure 11:
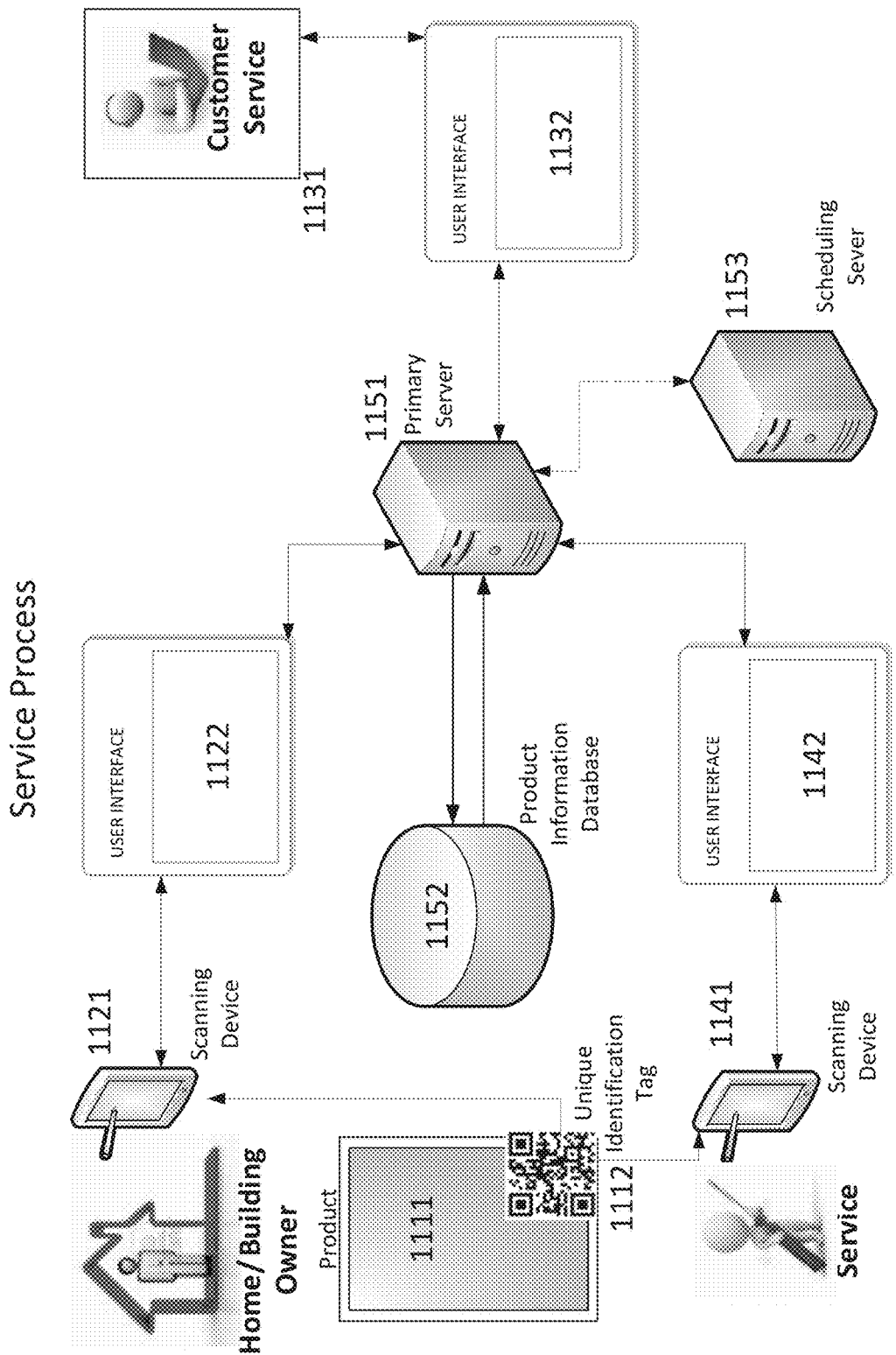
FIG. 11 is a simplified data flow diagram depicting the customer service process.

With reference now to FIG. 11, an example embodiment is provided to demonstrate the customer service process. The process starts with the on-site constituent interacting with the present invention. In the case of Technical Service/Support (TSS) it will normally be the 'owner' (or someone acting on their behalf) scanning the unique identification tag 1112 on product 1111 using a scanning device 1121, such as smart phone or tablet device. This scan will launch a web application and user interface 1122 that will enable the constituent to report an issue for the product. The web application 1122 will verify the user's contact information (from registration) and reference the serialized product ID for use in the TSS process. The web application will be provided to the scanning device 1121 via primary server 1151. The primary server 1151 will get the information related to the specific product from product information database 1152 using the information scanned from the unique identification tag 1112. The unique identifier on the unique identification tag 1112 will inform the service organization of the exact configuration of the product to assist in completion of the request because of its association with a unique record on database 1152. New information can also be added to the unique record on product information database 1152 during the customer service process. Alternatively, the on-site constituent could be presented with a trouble-shooting guide, eliminating the need for a service call via web application 1122.

Once the service request is submitted, the present invention will use the unique record from the product information database 1152 to inform customer service entity 1131 of the service request, the corresponding contact information and the exact configuration of the product. Based upon the information presented to customer service they would launch the TSS process using a web interface 1132 generated by primary server 1151. Many issues that require an initial visit (like getting a measurement or a color match) can be solved by knowing the exact product configuration through the invention. The entire TSS process will be improved by knowing the configuration information ahead of time. For example, the present invention can provide information such as whether a technician has the correct part, if the technician requires a part, or if the technician has been trained on a particular product configuration.

The technician will be able to use his scanning device 1141 (tablet, phone, laptop) to receive the consolidated information that is generated by this invention. The technician will be able to see his schedule and perform all job functions through an application provided via a user interface 1142 written for his smart device.

The on-site technician scans the unique identification tag 1112 with their smart device or laptop. He/she is presented with an application 1142 that is customized to the product/model that was scanned. The technician can then receive product alerts, recall notices, special instructions, warranty information, scheduled maintenance needs and previous service history. The technician will then be able to close out the ticket, bill the constituent and add comments to the original service request. A separate scheduling server 1153 is optional in the system and may be employed in addition to the primary server 1151 to provide additional scheduling functionality for both customer service and the on-site technician.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-implemented method, the method comprising:
    a. generating a unique identifier associated with an individual product item;
    b. attaching a machine readable unique identification tag to the individual product item, the unique identification tag being associated with the unique identifier, wherein the unique identification tag comprises at least a URL address and a unique product identifier concatenated onto the URL address;
    c. associating the unique identifier with a unique record;
    d. storing the association and the unique record;
    and at a time subsequent to steps a through d;
    e. receiving a signal comprising the unique identifier, the signal having been generated remotely by a device reading the unique identification tag;
    f. generating, responsive to the signal, a user interface for display via the remote device;
    g. displaying on the remote device via a screen incorporated on the remote device information related to the individual product item; and
    h. receiving a user-input signal related to the individual product item, the user-input signal being generated manually by a user operating the remote device and by a user-input incorporated on the remote device.

2. The computer-implemented method according to claim 1, wherein the signal further comprises context information.

3. The computer-implemented method according to claim 1, wherein the unique identification tag is a two dimensional barcode.

4. The computer-implemented method according to claim 3, wherein the two dimensional barcode is selected from a group consisting of a QR Code, a Microsoft High Capacity Color Barcode, an Aztec Code, a SPARQCode, a MaxiCode, and a DataMatrix.

5. The computer-implemented method according to claim 1, wherein the unique identification tag is a wireless non-contact identification tag.

6. The computer-implemented method according to claim 5, wherein the wireless non-contact identification tag is selected from a group consisting of an RFID tag and an NFC tag.

7. The computer-implemented method according to claim 1, wherein the unique record comprises at least one of the group consisting of: contact information, geographic information, homeowner information, building information, warranty information, product information, manufacturer information, builder information, and installation information.

8. The computer-implemented method according to claim 1, wherein associating the unique identifier with the unique record further comprises adding information related to the individual product item at the time the individual product item is manufactured.

9. The computer-implemented method according to claim 1, the method further comprising receiving, via the user interface, a service request related to the individual product item and the unique identifier.

10. The computer-implemented method according to claim 2, wherein the method further comprises:
    receiving, via the user interface, a selected set of data from the unique record to be analyzed;
    receiving, via the user interface, a selected set of criteria to use in analyzing the set of data; and
    generating a set of information based on the set of data and the set of criteria for display via the user interface.

11. A system having a server, a memory and a database, the system comprising:
    unique identification tag means for generating a unique identifier and associating the unique identifier with an individual product item;
    means for attaching a machine readable unique identification tag comprising at least a unique identifier, the unique identifier comprising a URL address and a unique product identifier concatenated onto the URL address, to the individual product item, the unique identification tag being associated with the unique identifier;
    means for associating the unique identifier with a unique record;
    a product information database for storing the unique record and the association between the unique identifier and the unique record;
    an input adapted to receive a signal comprising the unique identifier, the signal having been generated remotely by a device reading the unique identification tag; and
    means, responsive to the signal, for generating a user interface for display via the remote device and for receiving a further user-input signal related to the individual product item, the user-input signal being generated manually by a user operating the remote device and by a user-input incorporated on the remote device.

12. The system of claim 11, wherein the means for generating a user interface comprises a primary server adapted to retrieve the unique record from the product information database using the unique identifier received with the signal and further adapted to generate the user interface based on the unique record and the unique identifier.

13. The system of claim 11, wherein the signal further comprises context information.

14. The system of claim 11, wherein the system further comprises at least one secondary server.

15. The system of claim 14, wherein the unique identification tag is of a type selected from the group consisting of a two dimensional barcode and a wireless non-contact identification tag.

16. The system of claim 14, wherein the unique identification tag is of a type selected from the group consisting of a QR Code, a Microsoft High Capacity Color Barcode, an Aztec Code, a SPARQCode, a MaxiCode, a DataMatrix, an RFID tag and an NFC tag.

17. The system of claim 1, wherein the product information database comprises at least one unique record, the unique record consisting of at least one of contact information, geographic information, homeowner information, building information, warranty information, or product information.

18. The system of claim 1, wherein the means for associating the unique identifier with the unique record is further adapted to include with the unique record information related to the individual product item at the time the individual product item is manufactured.

19. The system of claim 1 further comprising means for receiving, via the user interface, a service request related to the individual product item and the unique identifier.

20. The system of claim 1 further comprises:
   means for receiving, via the user interface, a selected set of data from the unique record to be analyzed;
   means for receiving, via the user interface, a selected set of criteria to use in analyzing the set of data; and
   means for generating a set of information based on the set of data and the set of criteria for display via the user interface.

* * * * *